United States Patent [19]
Moisin

[11] Patent Number: 6,137,233
[45] Date of Patent: Oct. 24, 2000

[54] BALLAST CIRCUIT WITH INDEPENDENT LAMP CONTROL

[75] Inventor: Mihail S. Moisin, Brookline, Mass.

[73] Assignee: Electro-Mag International, Inc.

[21] Appl. No.: 09/173,977

[22] Filed: Oct. 16, 1998

[51] Int. Cl.[7] .................................................. H05B 37/02
[52] U.S. Cl. .................... 315/209 R; 315/161; 315/291; 315/307
[58] Field of Search .................................. 315/209 R, 224, 315/189, DIG. 5, DIG. 7, 160, 161, 205, 225, 226, 291, 307

[56] References Cited

U.S. PATENT DOCUMENTS

| | | | |
|---|---|---|---|
| 3,808,481 | 4/1974 | Rippel | 318/139 |
| 4,115,729 | 9/1978 | Young et al. | 322/86 |
| 4,164,785 | 8/1979 | Young et al. | 363/50 |
| 4,270,164 | 5/1981 | Wyman et al. | 363/56 |
| 4,415,839 | 11/1983 | Lesea | 315/308 |
| 4,423,363 | 12/1983 | Clark et al. | 318/375 |
| 4,480,298 | 10/1984 | Fry | 363/28 |
| 4,489,373 | 12/1984 | du Parc | 363/56 |
| 4,507,698 | 3/1985 | Nilssen | 361/42 |
| 4,525,648 | 6/1985 | De Bijl et al. | 315/224 |
| 4,572,988 | 2/1986 | Handler et al. | 315/209 R |
| 4,608,958 | 9/1986 | Sakakibara et al. | 123/605 |
| 4,618,810 | 10/1986 | Hagerman et al. | 318/803 |
| 4,624,334 | 11/1986 | Kelledes et al. | 180/79.1 |
| 4,675,576 | 6/1987 | Nilssen | 315/242 |
| 4,682,083 | 7/1987 | Alley | 315/307 |
| 4,684,851 | 8/1987 | Van Meurs | 315/224 |
| 4,712,045 | 12/1987 | Van Meurs | 315/224 |
| 4,783,728 | 11/1988 | Hoffman | 363/37 |
| 4,818,917 | 4/1989 | Vest | 315/171 |
| 4,864,486 | 9/1989 | Spreen | 363/126 |
| 4,866,586 | 9/1989 | Suko | 363/5 |
| 4,870,327 | 9/1989 | Jorgensen | 315/307 |
| 4,899,382 | 2/1990 | Gartner | 379/413 |
| 4,952,853 | 8/1990 | Archer | 318/254 |
| 4,991,051 | 2/1991 | Hung | 361/57 |
| 5,003,231 | 3/1991 | Perper | 315/291 |
| 5,004,955 | 4/1991 | Nilssen | 315/119 |
| 5,014,305 | 5/1991 | Moisin | 379/402 |
| 5,027,032 | 6/1991 | Nilssen | 315/103 |
| 5,052,039 | 9/1991 | Moisin | 379/402 |
| 5,063,339 | 11/1991 | Orii et al. | 318/696 |

(List continued on next page.)

FOREIGN PATENT DOCUMENTS

| | | | |
|---|---|---|---|
| 0460641 | 12/1991 | European Pat. Off. | H05B 41/233 |
| 0522266 | 1/1993 | European Pat. Off. | H05B 41/29 |
| 4010435 | 10/1991 | Germany | H05B 41/26 |
| 4032664 | 4/1992 | Germany | H05B 41/29 |
| 195 02 772 A1 | 1/1996 | Germany . | |
| 63-002464 | 11/1988 | Japan | H02H 9/08 |
| 1161948 | 8/1969 | United Kingdom . | |
| 2204455 | 11/1988 | United Kingdom | H02M 3/00 |
| 2 215 535 A | 9/1989 | United Kingdom . | |
| 9422209 | 9/1994 | WIPO | H02M 5/00 |
| 94/27419 | 11/1994 | WIPO . | |
| 9535646 | 12/1995 | WIPO | H05B 41/392 |

OTHER PUBLICATIONS

Kazimierczuk, Marian et al. "*Resonant Power Converters*", (1995), A Wiley–Interscience Publication, pp. 332–333.

"Simple Dimming Circuit for Fluorescent Lamp", IBM Technical Disclosure Bulletin, vol. 34, No. 4A, Sep. 1, 1991, pp. 109–111, XP000210848.

International Search Report dated Sept. 3, 2000.

*Primary Examiner*—Don Wong
*Assistant Examiner*—Thuy Vinh Tran
*Attorney, Agent, or Firm*—Nutter, McClennen & Fish, LLP

[57] ABSTRACT

A ballast circuit includes a rectifier for coupling to independent first and second AC input signals, a first inverter for energizing a first lamp and a second inverter for energizing a second lamp. A boost converter can be coupled between the rectifier and the inverters. The first inverter is enabled when the first AC input signal is applied to the rectifier and the second inverter is enabled when the second AC input signal is present.

17 Claims, 3 Drawing Sheets

U.S. PATENT DOCUMENTS

| | | | |
|---|---|---|---|
| 5,081,401 | 1/1992 | Moisin | 315/324 |
| 5,124,619 | 6/1992 | Moisin et al. | 315/219 |
| 5,138,233 | 8/1992 | Moisin et al. | 315/187 |
| 5,138,234 | 8/1992 | Moisin | 315/209 R |
| 5,138,236 | 8/1992 | Bobel et al. | 315/209 R |
| 5,144,195 | 9/1992 | Konopka et al. | 315/94 |
| 5,148,087 | 9/1992 | Moisin et al. | 315/291 |
| 5,173,643 | 12/1992 | Sullivan et al. | 315/276 |
| 5,177,408 | 1/1993 | Marques | 315/291 |
| 5,191,263 | 3/1993 | Konopka | 315/209 R |
| 5,216,332 | 6/1993 | Nilssen | 315/224 |
| 5,220,247 | 6/1993 | Moisin | 315/209 R |
| 5,223,767 | 6/1993 | Kulka | 315/209 R |
| 5,256,939 | 10/1993 | Nilssen | 315/244 |
| 5,291,382 | 3/1994 | Cohen | 363/16 |
| 5,309,066 | 5/1994 | Ditlevsen | 315/205 |
| 5,313,143 | 5/1994 | Vila-Masot et al. | 315/209 R |
| 5,315,533 | 5/1994 | Stich et al. | 364/480 |
| 5,332,951 | 7/1994 | Turner et al. | 315/209 R |
| 5,334,912 | 8/1994 | Counts | 315/119 |
| 5,363,020 | 11/1994 | Chen et al. | 315/209 R |
| 5,390,231 | 2/1995 | Hung et al. | 379/2 |
| 5,399,943 | 3/1995 | Chandrasekaran | 315/219 |
| 5,416,388 | 5/1995 | Shackle | 315/219 |
| 5,432,817 | 7/1995 | Hormel et al. | 375/257 |
| 5,434,477 | 7/1995 | Crouse et al. | 315/209 R |
| 5,434,480 | 7/1995 | Bobel | 315/224 |
| 5,444,333 | 8/1995 | Lau | 315/94 |
| 5,446,365 | 8/1995 | Nomura et al. | 320/14 |
| 5,481,160 | 1/1996 | Nilssen | 315/209 R |
| 5,493,180 | 2/1996 | Bezdon et al. | 315/91 |
| 5,504,398 | 4/1996 | Rothenbuhler | 315/209 R |
| 5,515,433 | 5/1996 | Chen | 379/398 |
| 5,563,479 | 10/1996 | Suzuki | 318/139 |
| 5,574,335 | 11/1996 | Sun | 315/119 |
| 5,579,197 | 11/1996 | Mengelt et al. | 361/93 |
| 5,583,402 | 12/1996 | Moisin et al. | 315/307 |
| 5,608,295 | 3/1997 | Moisin | 315/247 |
| 5,608,595 | 3/1997 | Gourab et al. | 361/79 |
| 5,638,266 | 6/1997 | Horie et al. | 363/132 |
| 5,684,683 | 11/1997 | Divan et al. | 33/65 |
| 5,686,799 | 11/1997 | Moisin et al. | 315/307 |
| 5,691,603 | 11/1997 | Nilson | 315/209 R |
| 5,691,606 | 11/1997 | Moisin et al. | 315/307 |
| 5,719,471 | 2/1998 | Kachmarik | 315/209 R |
| 5,729,098 | 3/1998 | Konopka et al. | 315/307 |
| 5,747,942 | 5/1998 | Ranganath | 315/224 |
| 5,798,617 | 8/1998 | Moisin | 315/247 |
| 5,821,699 | 10/1998 | Moisin | 315/291 |
| 5,825,136 | 10/1998 | Rudolph | 315/291 |
| 5,831,396 | 11/1998 | Rudolph | 315/307 |
| 5,866,993 | 2/1999 | Moisin | 315/307 |
| 5,925,986 | 7/1999 | Moisin | 315/247 |
| 6,034,489 | 3/2000 | Weng | 315/307 |
| 6,051,938 | 4/2000 | Arts et al. | 315/291 |

BALLAST CIRCUIT WITH INDEPENDENT LAMP CONTROL

CROSS REFERENCE TO RELATED APPLICATION

Not Applicable.

STATEMENT REGARDING FEDERALLY SPONSORED RESEARCH

Not Applicable.

FIELD OF THE INVENTION

The present invention relates to circuits that energize a load, and more particularly, to ballast circuits for energizing a plurality of lamps.

BACKGROUND OF THE INVENTION

There are many types of ballast circuits for energizing devices that emit visible light, such as fluorescent lamps. A so-called electronic ballast receives a relatively low frequency AC (Alternating Current) input signal and provides a relatively high frequency AC output signal to one or more lamps. Typically, the low frequency input signal corresponds to a standard 110 volt, 60 Hz signal which is selectively applied to the ballast by means of a conventional wall switch.

One type of electronic ballast includes a rectifier which receives the AC input signal and provides a DC (Direct Current) signal to an inverter. The inverter can be a resonant inverter which provides a relatively high frequency AC signal to the lamps at operational voltage and current levels which cause the lamps to emit light.

Generally, the ballast is coupled to a source of AC energy via a switch, for example a conventional wall switch, which controls the flow of energy to the ballast for turning the lamps on and off. That is, when the switch is set to an on position the AC signal is applied to the ballast which energizes the lamps such that they emit light. And when the switch is set to an off position, the AC signal is not applied to the ballast and the lamps do not emit light. However, conventional ballasts are not adapted for coupling to more than one AC input signal and do not provide independent control over multiple lamps coupled to the ballast.

It would, therefore, be desirable to provide a ballast circuit adapted for receiving more than one AC input signal and independently controlling a plurality of lamps coupled to the ballast.

SUMMARY OF THE INVENTION

The present invention provides a ballast circuit having independent control of a plurality of lamps. Although the invention is primarily shown and described as a ballast for a lamp, it is understood that the invention has other applications as well. For example, the invention is applicable to motor control circuits and voltage regulators.

In one embodiment, a ballast circuit has a plurality of input terminals for coupling to first and second AC energy sources and output terminals for connecting to first and second lamps. The ballast energizes the first lamp when a first AC energy signal, which corresponds to the first AC energy source, is applied to the ballast and energizes the second lamp when a second AC energy signal, which corresponds to the second AC energy source, is applied to the ballast. The ballast controls the flow of energy to each of the first and second lamps independently.

In one particular embodiment, the ballast includes a rectifier having AC input terminals coupled to the first and second AC energy sources and DC output terminals coupled to a boost converter. The boost converter provides DC energy to positive and negative rails of the first and second inverters which independently energize a respective one of the first and second lamps. A first control signal path, which provides a path for a first control signal, extends from the rectifier to the first inverter.

The first control signal has a state corresponding to the presence of the first AC signal.

A second control signal path extends from the rectifier to the second inverter to provide a circuit path for a second control signal. The second control signal has a state which corresponds to the presence of the second AC input signal. The first and second control signals selectively disable a respective one of the first and second inverters.

In an exemplary embodiment, the rectifier includes six rectifying diodes coupled so as to form first, second and third AC input terminals and positive and negative DC output terminals. The AC input terminals are adapted for receiving first and second AC input signals. In one embodiment, the first input terminal is coupled to a first black wire, the second input terminal is coupled to first and second white wires, and the third input terminal is coupled to a second black wire. It is understood that the first and second white wires can comprise a single wire or two wires that are electrically coupled. The first black and white wires (and first AC input signal) can correspond to a first 110 volt, 60 Hz signal and the second black and white wires (and second AC input signal) can correspond to a second 110 volt, 60 Hz signal. The DC output terminals are coupled to a boost converter which energizes the positive and negative rails of the first and second inverters. The first inverter powers a first pair of lamps and the second inverter powers a second pair of lamps.

In one embodiment, the first inverter has first and second switching elements coupled in a half bridge configuration with the conduction state of the switching elements being controlled by respective first and second control circuits. Similarly, the second inverter, also having a half-bridge configuration, has third and fourth switching elements controlled by respective third and fourth control circuits. A first control signal path extends from the first AC input terminal of the rectifier to the first control circuit. When the first AC input signal is not present, the first inverter is disabled by the first control circuit such that the first switching element is prevented from transitioning to a conductive state. And when the first AC signal is present, the first inverter is enabled such that the first control circuit alternately biases the first switching element to conductive and non-conductive states so as to allow resonant operation of the inverter and provide AC energy to the first lamp. Similarly, a second control signal path extends from the third AC input terminal to the third control circuit and the second inverter is enabled by the presence of the second AC input signal at the rectifier.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
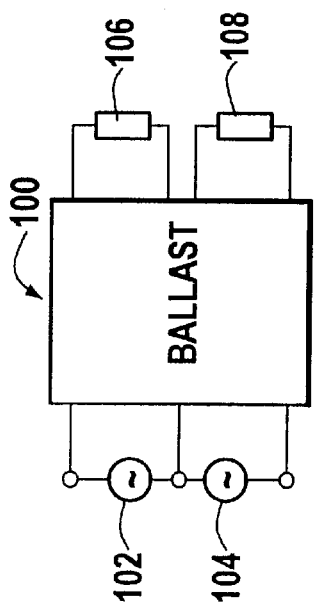
FIG. 1 is a schematic block diagram of a ballast circuit in accordance with the present invention.

FIG. 1 shows a ballast circuit 100 coupled to first and second AC energy sources 102,104 and to first and second lamps 106,108. The first energy source 102 provides a first AC input signal and the second AC energy source 104 provides a second AC input signal. The first AC input signal enable the ballast to energize the first lamp 106 and the second AC input signal enable the ballast to energize the second lamp 108. As described below, the ballast 100 independently energizes each of the first and second lamps 106,108.

Figure 2:
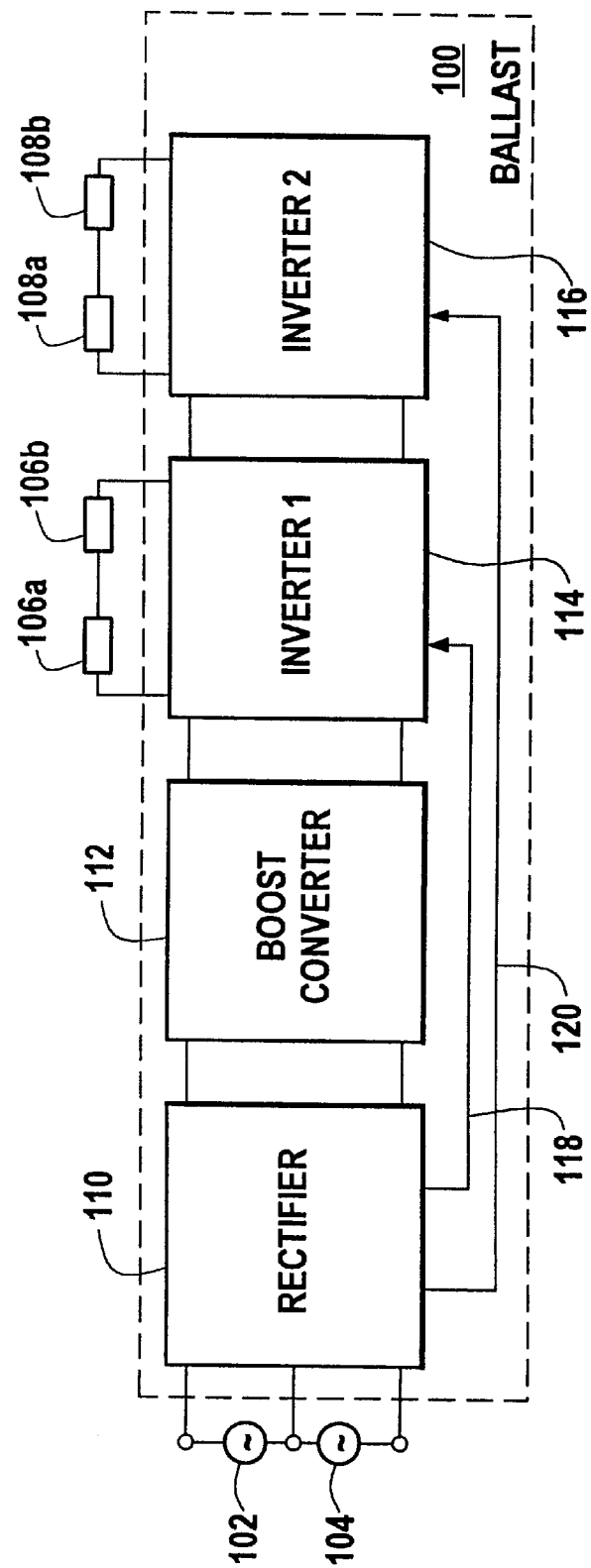
FIG. 2 is a schematic block diagram showing further details of the ballast circuit of FIG. 1.

As shown in FIG. 2, the ballast circuit 100 includes a rectifier 110 for receiving the first and second AC input signals and for providing DC energy to a boost converter 112. The boost converter 112 provides DC signal levels to first and second inverters 114,116 which energize first and second pairs of lamps 106a,b,108a,b, respectively. The rectifier 110 also provides a first control signal via a first control signal path 118 to the first inverter 114 and a second control signal via a second control signal path 120 to the second inverter 114. The first control signal 118 is indicative of whether the first AC input signal is being applied to the rectifier and the second control signal 120 is indicative of whether the second AC input signal is present. The first and second controls signals are effective to selectively enable the inverters to control the flow of energy to the lamps 106,108.

Figure 3:
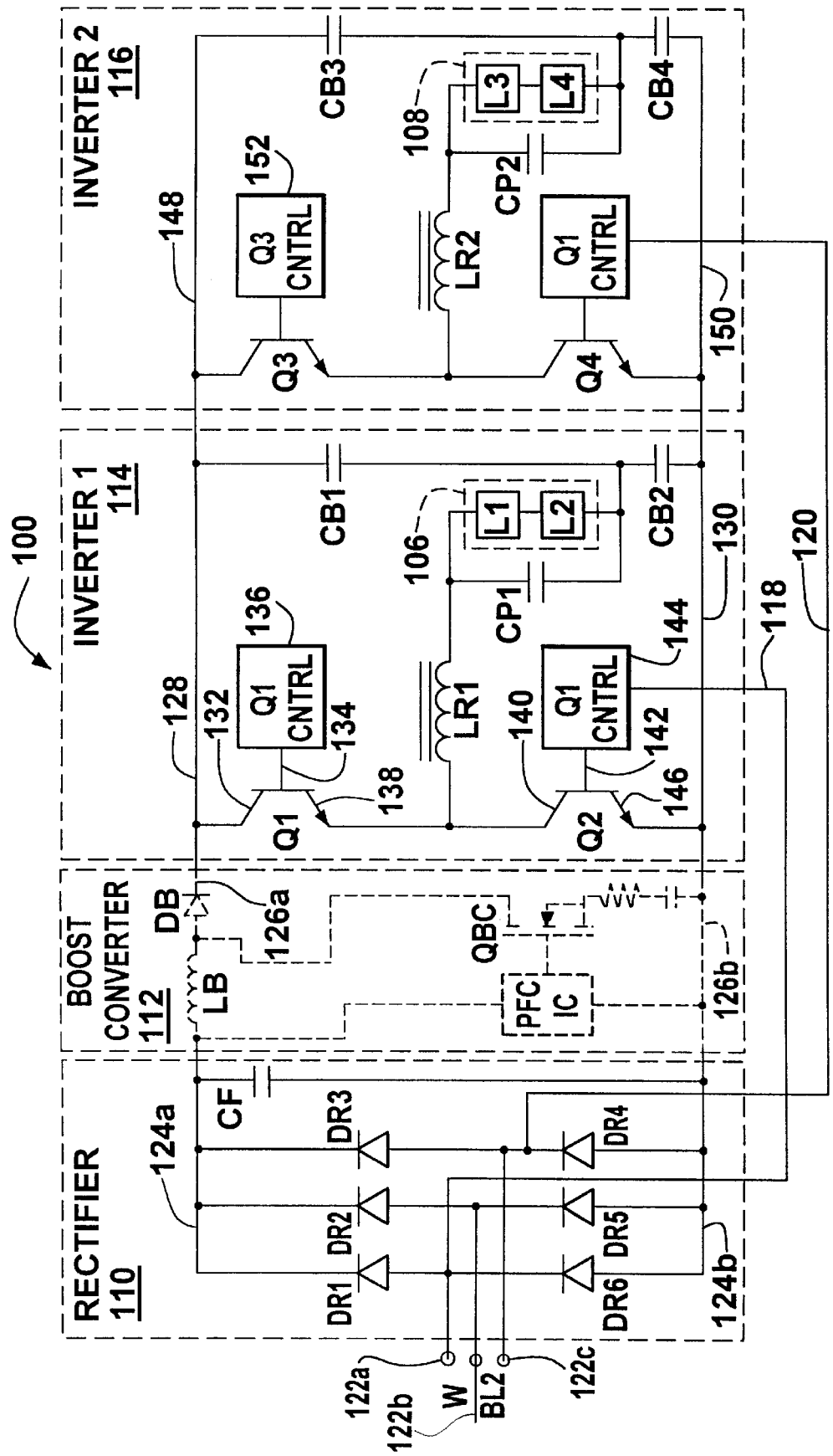
FIG. 3 is a circuit diagram of an exemplary embodiment of the ballast of FIG. 1.

FIG. 3 shows an exemplary circuit implementation of the ballast circuit 100 of FIG. 2, wherein like reference designations indicate like elements. The rectifier 110 includes six rectifying diodes DR1-6 coupled so as to provide first, second, and third AC input terminals 122a,b,c and first and second DC output terminals 124a,b. The first AC input terminal 122a is located between the first and sixth rectifying diodes DR1,DR6, which are coupled end to end between the DC output terminals 124a,b. Similarly, the second AC input terminal 122b is located between the second and fifth rectifying diodes DR2,DR5 and the third AC input terminal 122c is located between the third and fourth rectifying diodes DR3,DR4. In an exemplary embodiment, the first AC input terminal 122a is coupled to a first black wire BL1, the second input terminal 122b is coupled to white wire W12, and the third input terminal 122c is coupled to a second black wire BL2. The first AC signal corresponds to a conventional 110 volt, 60 Hz signal transmitted via the first black and white wires BL1,W12 and the second AC signal corresponds to a 110 volt, 60 Hz signal transmitted via the second black and white wires BL2,W12. It is understood that the white wire W12 can comprise a single wire or a pair of electrically coupled wires, such as, a first white wire corresponding to the first black wire BL1 and a second white wire corresponding to the second black wire BL2.

The DC output terminals 124a,b of the rectifier 110 are coupled to the optional boost converter 112. The boost converter 112 is effective to boost the voltage of the DC signal provided to the inverters 114,116 and to provide power factor correction. Boost converters are well known to one of ordinary skill in the art. In one embodiment shown in phantom, the boost converter 112 includes a power factor correction integrated circuit PFC IC coupled to a FET (field effect transistor) QBC for controlling a conduction state of the FET. The power factor correction integrated circuit can be of the type manufactured by SGS-Thomson Microelectronics of Schaumburg, Ill., and identified as L6560, L6560A, and L6561. The boost converter 112 further includes a boost inductor LB and a diode DB which form a series circuit path from the rectifier output terminal 124a to the first inverter 114. The boost converter 112 includes a first output terminal 126a coupled to a positive rail 128 of the first inverter 114 and a second output terminal 126b coupled to a negative rail 130 of the first second inverter.

The first inverter 114 is shown having first and second switching elements Q1,Q2 coupled in a half bridge arrangement. However, it is understood that other inverter configurations are possible, such as full bridge topologies. The first switching element Q1, shown as a transistor, has a collector terminal 132 coupled to the positive rail 128 of the inverter 114, a base terminal 134 coupled to a first or Q1 control circuit 136, and an emitter terminal 138 coupled to the second switching element Q2. The second switching element Q2 has a collector terminal 140 coupled to the emitter terminal 138 of the first switching element Q1, a base terminal 142 coupled to a second or Q2 control circuit 144, and an emitter terminal 146 coupled to the negative rail 130 of the inverter 114. The conduction state of the first switching element Q1 is controlled by the first control circuit 136 and the conduction state of the second switching element Q2 is controlled by the second control circuit 144.

The first inverter 114 further includes a first resonant inductive element LR1 coupled at one end to a point between the switching elements Q1,Q2 and at the other end to a first parallel capacitor CP1. The lamps in the first pair of lamps 106 (first lamp 106a, second lamp 106b) are coupled end to end such that the lamps are connected in parallel with the first parallel capacitor CP1. First and second bridge capacitors CB1,CB2 are coupled end to end between the positive and negative rails 128,130 of the inverter. The junction of the second lamp 106b and the parallel capacitor CP1 is coupled to a point between the first and second bridge capacitors CB1,CB2.

The second inverter 116 has a configuration that mirrors that of the first inverter 114. Third and fourth switching elements Q3,Q4 are coupled in a half bridge configuration between the positive and negative rails 148,150 of the second inverter 116 with conduction states determined by third and fourth control circuits 152,154 respectively. A resonant circuit is formed by a second resonant inductive element LR2, a second parallel capacitor CP2 and the second pair of lamps 108 (third lamp 108a, fourth lamp 108b). Third and fourth bridge capacitors CB3,CB4 are coupled end to end across the rails 148,150 of the second inverter 116 with a lamp current path connected to a point between the bridge capacitors CB3,CB4.

The first control path 118, which provides a signal path for the first control signal, extends from the first input terminal 122a of the rectifier 110 to the second control circuit 144. The second control path 120, which provides a signal path for the second control signal, extends from the third input terminal 122c to the fourth control circuit 154. The first control signal is indicative of whether the first AC input signal (on wires BL1,W12) is being applied to the first and second input terminals 122a,b of the rectifier. And the second control signal corresponds to whether the second AC input signal (on wires BL2,W12) is present on the second and third terminals 122b,c of the rectifier. The first and second control signals provide independent control over the first and second inverters 114,116. That is, the first inverter 114 can energize the first pair of lamps 106 when the first AC input signal is present. And the second inverter 116 can energize the second pair of lamps 108 when the second AC signal is present.

In operation, the first and second inverters 114,116 each operate at or about a characteristic resonant frequency which is determined by the impedances of the various circuit elements, such as the respective resonant inductive elements, LR1,LR2, parallel capacitors CP1,CP2 and lamps 106,108. For the first inverter 114, current through the lamps 106 flows in a first direction while the first switching element Q1 is conductive and in a second, opposite direction when the second switching element Q2 is conductive. The current periodically reverses direction as determined by the resonant frequency of the circuit. The first and second control circuits 136,144 control the respective conduction states of the first and second switching elements Q1,Q2 to facilitate resonant operation of the circuit.

When the first AC input signal is applied to the rectifier 110, the first control signal, via the first control path 118, enables the second control circuit 144 to bias the second switching element to the conductive state. Thus, when the first AC signal is present the first inverter 114 is enabled to resonate such that the ballast energizes the first pair of lamps 106 with AC energy which causes the lamps to emit light.

When the first AC signal is not present at the rectifier 110, the first control signal conveys this information to the second control circuit 144 which prevents the second switching element Q2 from transitioning to a conductive state. Thus, the first inverter 114 cannot resonate and is thereby disabled when the first AC signal is not applied to the rectifier 110. With the first inverter disabled, the first pair of lamps 106 is not energized.

Similarly, when the second AC input signal is present at the rectifier 110, the second control signal, via the second control path 120, enables the fourth control circuit 154 to bias the fourth switching element Q4 to a conductive state for resonant operation of the second inverter 116. And when the second AC input signal is not present, the fourth control circuit 154 prevents the turning on of the fourth switching element Q4 thereby disabling the second inverter 116.

Figure 4:
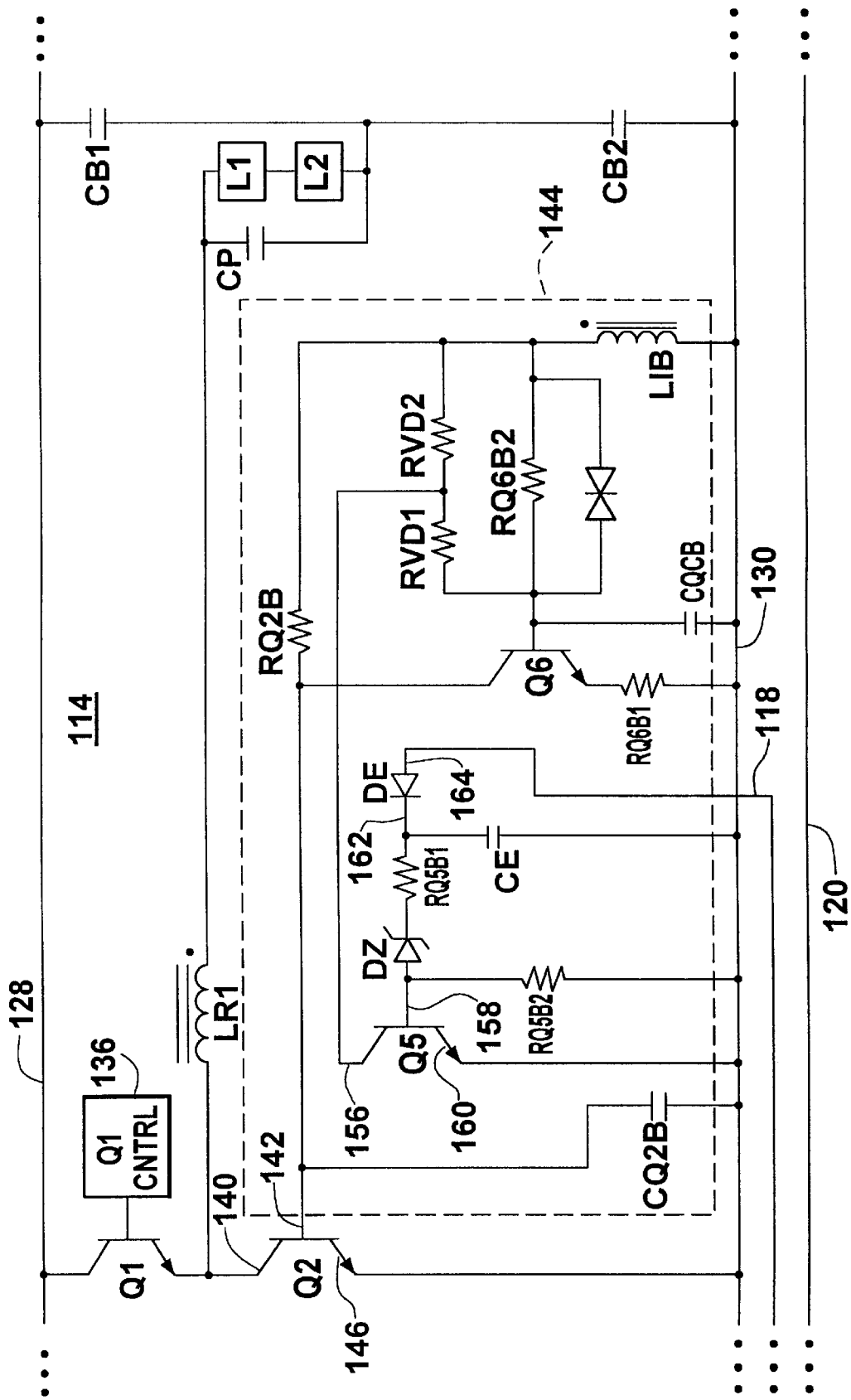
FIG. 4 is a circuit diagram showing further details of the circuit of FIG. 3.

FIG. 4 shows an exemplary embodiment of the second control circuit 144 of FIG. 3, wherein like reference designations indicate like elements. The second control circuit 144 includes fifth and sixth switching elements Q5,Q6 that are effective to enable the second switching element Q2 to transition to a conductive state when the first AC signal is present on the first control path 118. In general, when the fifth switching element Q5 is conductive (i.e., the first AC signal is present) the second switching element Q2 can transition to a conductive state to achieve resonant operation of the first inverter 114. And when the fifth switching element Q5 is not conductive (i.e., the first AC signal is not present), the sixth switching element Q6 transitions to a conductive state which prevents the second switching element Q2 from transitioning to a conductive state, thereby disabling the first inverter 114.

It is understood that a control path indicating the presence of an AC signal at the rectifier can be coupled to either or both of the first and second control circuits 136,144. It is further understood that the second control path 120 is coupled to the second inverter 116 (FIG. 3) for selectively enabling the third and/or fourth switching elements Q3,Q4.

In the exemplary embodiment of FIG. 4, the second control circuit 144 includes a first capacitor CQ2B coupled at one terminal to the base terminal 142 of the second switching element Q2 and at the other terminal to the negative rail 130 of the first inverter. A first resistor RQ2B and inductive bias element L1B provide a series circuit path from the base terminal 142 to the negative rail 130. The bias element L1B is inductively coupled to the first resonant inductive element L1R such that current flow through the first resonant inductive element L1R induces a corresponding voltage in the bias element L1B which biases the base terminal 142 of the second switching element Q2. As known to one of ordinary skill in the art, as current flow through the first resonant inductive element L1R periodically reverses direction due to resonance of the circuit, the corresponding voltage induced at the bias element L1B is effective to alternately bias the second switching element to conductive and non-conductive states.

The fifth switching element Q5, shown as a transistor, has a collector terminal 156 coupled to a point between first and second voltage dividing resistors RDV1,RVD2, a base terminal 158, and an emitter terminal 160. A zener diode DZ, a second resistor RQ5B1 and an enable capacitor CE provide a series circuit path from the base terminal 158 of the fifth switching element Q5 to the negative rail 130 of the first inverter 114. A third resistor RQ5B2 is coupled between the base terminal 158 and the negative rail 130. An enable diode DE has a cathode 162 coupled to the enable capacitor CE and an anode 164 coupled to the first control path 118 which extends to a point between the first and sixth diodes DR1, DR6, i.e., the first AC input terminal 122a of the rectifier 110 (FIG.3).

The sixth switching element Q6 has a collector terminal 166 coupled to the base terminal 142 of the second switching element Q2, a base terminal 168 coupled to an RC network, and an emitter terminal 170 coupled to the negative rail 130 via a resistor RQ6B1. A capacitor CQ6B is coupled between the base terminal 168 and the negative rail 130. A first series circuit path extends from the base terminal 168 through the first and second voltage resistors RVD1,RVD2, and the bias element L1B to the negative rail 130. A second series circuit path extends from the base terminal 168 through a resistor RQ6B2 and the bias element L1B to the negative rail 130. A diac DD1 is coupled at one terminal to the base terminal 168 and to the bias element L1B at the other terminal.

Referring now to FIG. 4 in combination with FIG. 3, when the first AC input signal, via the first black and white wires BL1,W12, is applied to the first and second input terminals 122a,b of the rectifier 110, the first control signal path 118 provides this AC signal to the second control circuit 144. The AC signal is rectified by the enable diode DE and the enable capacitor CE is charged to a predetermined voltage level. When the enable capacitor CE is charged to level greater than a voltage threshold associated with the zener diode DZ, the base of the fifth switching element Q5 is biased with a positive potential that is effective to transition Q5 to a conductive state. And when Q5 is conductive, the sixth switching element Q6 is prevented from transitioning to a conductive state. The sixth switching element Q6, when it is in the conductive state, effectively shorts the second switching element Q2 thereby disabling the first inverter 114. The sixth switching element Q6 can become conductive during operation of the circuit unless the fifth switching element Q5 is turned on by the first AC signal.

The ballast circuit 100 can be coupled to remotely located first and second wall switches which independently control the flow of respective first and second AC signals to the ballast. The ballast independently enables the flow of energy to respective first and second lamps connected to the ballast. The ballast energizes the first lamp when the first AC signal is present and energizes the second lamp when the second AC signal is present. Thus, a single ballast receives first and second AC input signals each of which is effective to energize a respective one of the first and second lamps.

In some areas it is required that, for a light fixture housing four lamps, two of the lamps can be turned off. To fulfill this requirement, a typical configuration includes a first ballast coupled to a first wall switch and a first pair of lamps and a second ballast coupled to a second wall switch and a second pair of lamps. The first wall switch controls the first pair of lamps and the second wall switch controls the second pair of lamps.

In contrast, a ballast 100 in accordance with the present invention can energize four lamps housed in a single light fixture. In one embodiment, a first wall switch, which is coupled to the ballast 100, controls the first pair of lamps and a second wall switch, which is also coupled to the ballast 100, controls the second pair of lamps. Thus, a single ballast 100 independently energizes first and second pairs of lamps housed in a four lamp light fixture.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A circuit, comprising:
   a rectifier having first AC input terminals for coupling to a first AC input signal, second AC input terminals for coupling to a second AC input signal and a pair of DC output terminals;
   a first inverter coupled to the rectifier, the first inverter being effective to energize a first load while the first AC input signal is applied to the rectifier;
   a first control circuit coupling the rectifier to the first inverter to disable the first inverter when the first AC signal is not applied to the rectifier;
   a second inverter coupled to the rectifier and coupled to said first inverter, the second inverter being effective to energize a second load while the second AC input signal is applied to the rectifier; and
   a second control circuit coupling the rectifier to the second inverter to disable the second inverter when the second AC input signal is not applied to the rectifier.

2. The circuit according to claim 1, further including a boost converter coupled between the rectifier and at least one of the first and second inverters.

3. The circuit according to claim 1, wherein the rectifier includes six diodes.

4. The circuit according to claim 1, wherein the rectifier includes first, second, and third pairs of diodes, wherein each of the first, second, and third diode pairs include first and second diodes coupled end to end between the DC output terminals of the rectifier.

5. The circuit according to claim 4, wherein a point between the diodes in the first pair of diodes is adapted for receiving the first AC input signal.

6. The circuit according to claim 5, wherein a point between the diodes in the second pair of diodes is adapted to receive the second AC input signal.

7. The circuit of claim 5, wherein the first control circuit includes a first switching element for controlling a conduction state of said first inverter, and a first control signal path extends from the point between the diodes in the first pair of diodes to the first control circuit.

8. The circuit of claim 7, wherein the second control circuit includes a second switching element for controlling a conduction state of said second inverter, and a second control signal path extends from the point between the diodes in the second pair of diodes to the second control circuit.

9. The circuit according to claim 5, wherein the first inverter has a half bridge configuration.

10. A ballast circuit, comprising:
    a rectifier having a first pair of AC input terminals for coupling to a first AC input signal, a second pair of AC input terminals for coupling to a second AC input signal, and a pair of DC output terminals;
    a boost converter having input and output terminals, the output terminals being coupled to the pair of rectifier DC output terminals;
    a first inverter coupled to the boost converter output terminals, the first inverter energizing at least one lamp coupled thereto, wherein the first inverter includes positive and negative rails;
    a second inverter having a positive rail coupled to the positive rail of the first inverter and a negative rail coupled to the negative rail of the first inverter, the second inverter energizing at least one lamp coupled thereto;
    a first control circuit coupling the rectifier to the first inverter; and
    a second control circuit coupling the rectifier to the second inverter;
    wherein the first inverter is prevented from energizing the at least one lamp coupled thereto in the absence of the first AC input signal being applied to the rectifier by the first control circuit, and the second inverter is prevented from energizing the at least one lamp coupled thereto in the absence of the second AC signal being applied to the rectifier by the second control circuit.

11. The ballast circuit according to claim 10, wherein the rectifier includes six diodes, the diodes being coupled so as to form three pairs of diodes, wherein each of the diode pairs includes first and second diodes coupled end to end across the DC output terminals.

12. The ballast circuit according to claim 11, wherein the first inverter includes first and second switching elements and the second inverter includes third and fourth switching elements.

13. The ballast circuit of claim 12, wherein a first control path extends from a point between the diodes in the first pair of diodes and the first control circuit coupled to the first switching element for controlling a conduction state of the first switching element.

14. The ballast circuit of claim 13, wherein a second control path extends from a point between the diodes in the second pair of diodes and the second control circuit coupled to the third switching element for controlling a conduction state of the third switching element.

15. The circuit according to claim 14, wherein the first and second pairs of AC input terminals have a common terminal.

16. The circuit according to claim 11, wherein the first pair of AC input terminals corresponds to a first point between the first and second diodes in the first pair of diodes and a second point between the first and second diodes in the second pair of diodes.

17. The circuit according to claim 16, wherein the second pair of AC input terminals corresponds to the second point between the first and second diodes in the second pair of diodes and a third point between the first and second diodes in the third pair of diodes.

* * * * *